United States Patent [19] | [11] 4,063,298
Tornetta et al. | [45] Dec. 13, 1977

[54] INSULATED LIGHTNING ARRESTER SUPPORT WITH REMOTE GROUNDING CONTROL

[76] Inventors: Lawrence A. Tornetta, 607 E. Germantown Pike, Norristown, Pa. 19401; Harry J. Hettel, 135 Leslie Lane, West Chester, Pa. 19380; Earle Hamilton, 1423 Breton Hills Drive, Hartsville, Pa. 18974; David R. Earl, 1541 Dean Drive, Lansdale, Pa. 19446

[21] Appl. No.: 727,392

[22] Filed: Sept. 29, 1976

[51] Int. Cl.² .......... H02H 7/04
[52] U.S. Cl. .......... 361/40; 337/156; 361/131
[58] Field of Search .......... 361/117, 131, 132, 35, 361/38, 39, 40; 200/48 KB; 337/155, 156

[56] References Cited

U.S. PATENT DOCUMENTS

| | | | |
|---|---|---|---|
| 2,464,565 | 3/1949 | Evans et al. | 361/132 |
| 2,993,146 | 7/1961 | Winter | 361/117 X |
| 3,810,060 | 5/1974 | Hubbard | 337/155 |

*Primary Examiner*—Harry E. Moose, Jr.
*Attorney, Agent, or Firm*—Paul & Paul

[57] ABSTRACT

A lightning arrester is mounted on one end of a rigid insulator bar, the other end of which is mounted by a metal bracket to the grounded casing of an electrical distribution transformer. The ground terminal of the arrester is electrically connected with a terminal on the insulator bar intermediate the arrester mounting and the transformer mounting. A switch is remotely operable to establish electrical communication between the transformer casing and the intermediate terminal, and thus to the ground terminal of the lightning arrester.

5 Claims, 2 Drawing Figures

INSULATED LIGHTNING ARRESTER SUPPORT WITH REMOTE GROUNDING CONTROL

BACKGROUND OF THE INVENTION

This invention relates to safety equipment in electrical power distribution systems, and more particularly to apparatus for safely installing lightning arresters in association with distribution transformers.

In electrical distribution systems, it is common practice to provide lightning arresters in parallel association with distribution transformers, whereby voltage surges such as may result from lightning are safely dissipated to ground. These arresters commonly involve an upper connection to the high voltage transformer input, and a lower connection to electrical ground, usually the grounded conductive casing of the transformer. In the past, this was typically done by mounting the arrester on the transformer casing with a metallic bracket electrically connected to the ground terminal of the arrester.

Recently, the power industry has commenced development of ever higher voltage transmission and distribution, for example on the order of 34 KV. Among other difficulties which have eventuated from this development are dangers in installing lightning arresters in conjunction with distribution transformers.

It will be appreciated that conventional lightning arresters involve a porcelain housing enclosing a complex array of conductors, insulating gaps, and the like. Should cracks occur in the porcelain of the arrester, gases may accumulate therein, creating a very real hazard that the arrester will explode under the stress of the high voltage distribution potential. This danger is most apparent upon installation of the arrester, when the installer is in close physical proximity with the transformer-arrester combination.

It is a primary object of the present invention to provide safety and mounting apparatus for installation of lightning arresters in conjunction with distribution transformers wherein in the danger of injury caused by arrester explosion is minimized.

It is a further object to provide such mounting apparatus wherein final electrical connection of the arrester with the transformer circuit is accomplished from a relatively safe, spatially remote location with respect to the arrester.

SUMMARY OF THE INVENTION

The present invention involves an insulated bracket for mounting lightning arresters in conjunction with grounded transformer casings whereby the arrester may first be safely physically mounted to the transformer in the absence of a complete electrical connection therebetween. Appropriate conductive points are located on the bracket, which, in conjunction with remotely actuated switch means, enable completion of the electrical circuit between the arrester and the transformer once the installer has moved to a location a safe distance away.

In an illustrative embodiment, a rigid, elongated insulator rod is connected at one end to a grounded transformer casing by means of a conductive metal bracket. A lightning arrester is mounted on the other end of the insulating rod, and the high voltage terminal of the arrester is appropriately connected to the high voltage input of the transformer. The lower, or ground terminal of the arrester is connected to an intermediate point on the bracket, allowing for later completion of the electrical circuit between the metal bracket and that intermediate point. A remotely actuated switch means spanning these two points is operable to complete the electrical circuit by closure from a suitable remote point.

DETAILED DESCRIPTION

Figure 1:
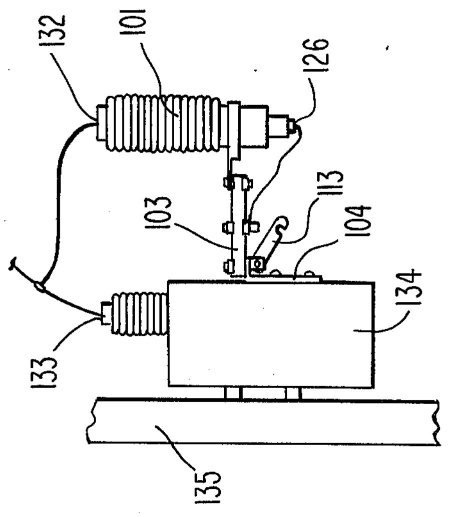
FIG. 1 shows a side elevational view of a lightning arrester mounting in conjunction with a distribution transformer in accordance with the principles of the present invention.

In FIG. 1, a conventional lightning arrester 101 having a porcelain or ceramic casing is mounted in association with a conventional distribution transformer 134, which in turn has a conductive, grounded casing mounted on a pole 135. An upper terminal 132 of the arrester 101 is electrically connected to a high voltage input terminal 133 of the transformer 134. It is the principal function of the present invention to provide a suitable mounting of the arrester 101 to the transformer 134, and to provide a suitable remotely established electrical connection between the lower, or ground terminal 126 of the arrester 101, and the grounded conductive casing of the transformer 134. As will be set forth in greater detail hereinafter, the mounting function is principally established in electrical isolation between the arrester 101 and the transformer 134 by an insulating bracket rod 103, and the electrical connection between arrester 101 and transformer 134 is later established by operation of a remotely actuated switch 113.

Figure 2:
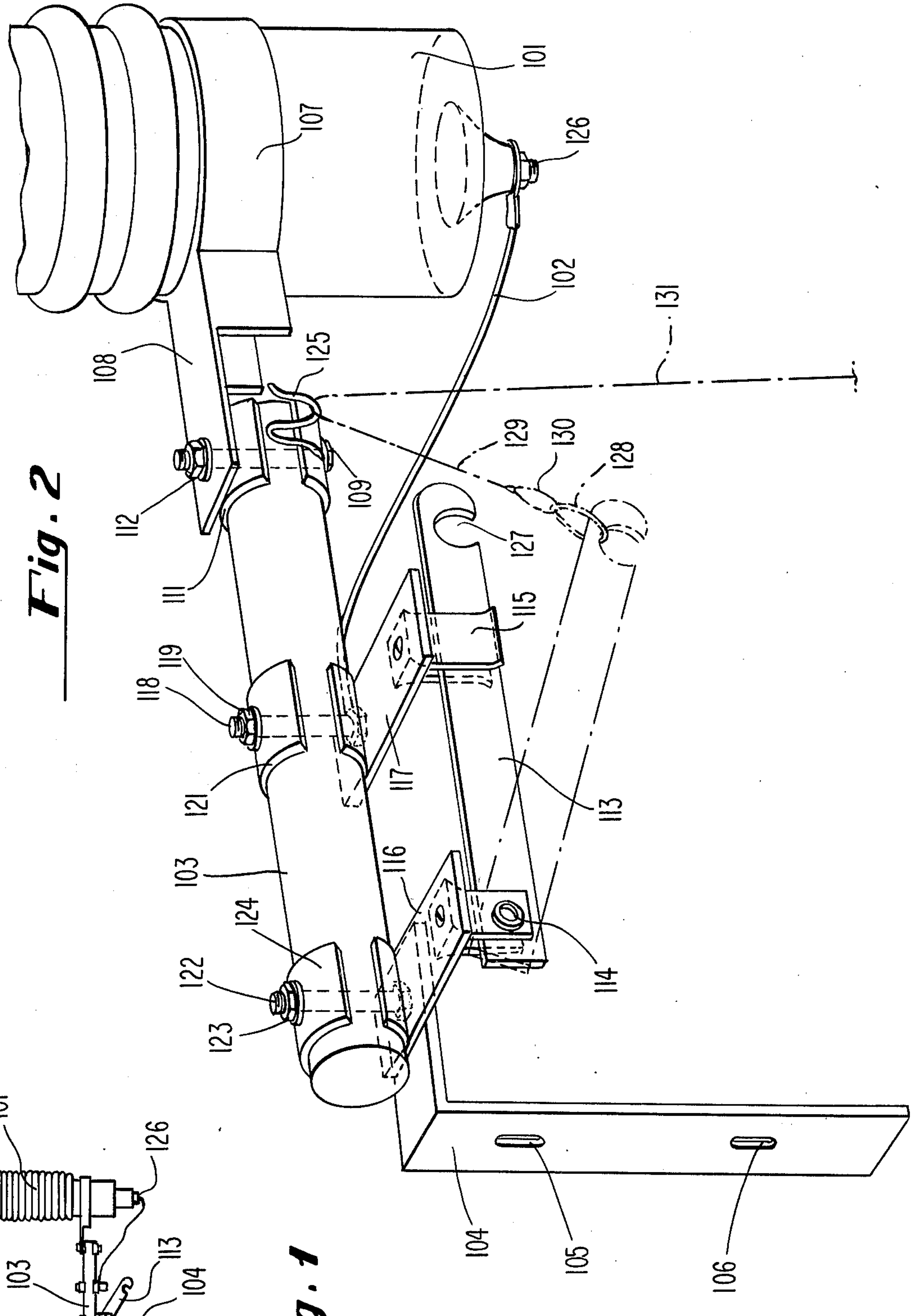
FIG. 2 shows a detailed isometric view of a preferred embodiment of the present invention.

With reference to FIG. 2, the arrester 101 is shown mounted to the outer end of a rigid, elongated insulating rod 103. In a preferred embodiment, the arrester 101 is mounted onto rod 103 by means of a sleeve 107 surrounding the arrester, to which there is affixed a bracket extension 108. A bolt 109 penetrates the outer extremity of rod 103, and in conjunction with a sleeve 111 and nut 112, rigidly attaches the bracket 108 to the rod 103, and in turn provides a mounting of the arrester 101. A wire hook 125 also is attached to the rod 103 by bolt 109, and functions as described hereinafter as a preferred mode of remote switch closure.

The end of rod 103 opposite the arrester 101 is mounted in similar fashion by bolt 122, nut 123, and sleeve 124 to a rigid, electrically conductive "L" bracket 104. The vertical arm of bracket 104 is provided with openings 105 and 106 for securement of the bracket 104 to the grounded, conductive casing of a distribution transformer such as transformer 134 of FIG. 1. A conductive, metallic flange 116 communicates electrically with the bracket 104, but depends outwardly therefrom to provide a terminal for establishment of an eventual electrical ground connection between the transformer casing and ground terminal 126 of the arrester 101.

At a point on rod 103 intermediate the arrester and transformer mountings thereof is yet another metallic, electrically conductive flange 117 which depends outwardly from the rod 103 and which is secured to the rod by a bolt 118, nut 119, and sleeve 121. An electrical conductor 102 extents from the flange 117 to the ground terminal 126 of the arrester 101. Hence, establishment of an electrical circuit between arrester 101 and the transformer casing via bracket 104 may be accomplished by electrical interconnection of flanges 116 and 117. In the preferred embodiment shown in FIG. 2, this interconnection is established by pivotal operation of a switch bar 113 about point 114 and into or out of contact points 115. So long as the switch 113 is in the open position, as shown in phantom in FIG. 2, the circuit between arrester 101 and the transformer casing is incomplete by virtue of the insulating character of rod 103. Whenever switch bar 113 is closed to contacts 115 as shown in solid lines in FIG. 2, there exists a complete circuit between the arrester 101 and the bracket 104, and in turn to the transformer to which bracket 104 is attached.

In accordance with the principles of the present invention, the arrester 101, the rod 103, and the bracket 104 are assembled and mounted as shown with the switch 113 remaining in its open position as shown in phantom in FIG. 2. Once the structural assembly is completed, the closure of switch 113 is accomplished remotely, such that, if completion of this circuit results in an explosion in the arrester 101, the installer will not be subjected to danger and injury therefrom.

It will be apparent that numerous means may be provided for closure of the switch 113; a simple, inexpensive, and effective alternative is shown in FIG. 2. In that figure, the switch bar 103 is longer than the distance between conductive flanges 116 and 117, and defines a hooked opening 127 at an extremity thereof. When the switch bar 113 is in its open position and all structural assembly is complete, an insulating element such as a rubber O-ring 128 is looped over the bar 113 and into the opening 127, and an insulating line such as nylon monofilament 129 is tied in a loop 130 about the O-ring 128, and is draped over the hook 125 and thence is extended outwardly at 131 to the point of remote closure, typically on the ground below the installation. Once this is accomplished, the installer removes himself to the remote closure position, pulls on the lower portion 131 of the insulating line 129, and in turn forces the bar 113 upwardly between the terminals 115, thereby completing the electrical interconnection between ground terminal 126 and the bracket 104. Further withdrawal force on the insulating line 129 will cause the loop 130 to cut through the O-ring 128, and the line itself 129 and the fragmented ring 128 will fall to ground, leaving a completed interconnection as shown in FIG. 2.

It will be apparent that numerous alternative remote closure schemes may be employed, including automatic time delay closures including springs, detents, and timers, or alternatively pyrotechinc devices fired by a remote radio signals, and the like.

In a preferred embodiment the insulating rod is constructed of materials commercially available under the trade name "Epoxiglas," but it is to be understood that a large variety of suitable materials are commercially available, their only critical requirements being their electrically insulating character, and their possession of sufficient strength and rigidity to support conventional lightning arrester apparatus and the associated switch gear set forth hereinbefore.

It will further be understood that numerous alternative embodiments will occur to those of ordinary skill in the art without departure from the spirit or scope of the present invention, as defined by the following claims.

We claim:

1. In association with a distribution transformer having a grounded metallic casing and a high voltage terminal, and a lightning arrester having a ground connection and high voltage terminal connected to the high voltage terminal of said transformer, safety apparatus comprising:

an insulating support member extending from said transformer casing, said arrester being mounted on said support member in insulating spaced relation to said transformer casing; and remotely actuated means for making electrical connection between said transformer casing and said ground connection of said arrester.

2. Apparatus as described in claim 1, wherein said support member comprises a rigid insulating bar coupled at one end to said casing and at its other end to said transformer, said bar having first and second electrical terminals thereon respectively electrically connected to said casing and to the ground connection of said arrester, said remotely actuated means being operable to connect electrically said first and second terminals.

3. Apparatus as described in claim 2, wherein said first terminal is integral with a metallic bracket coupling said one end to said casing, and said second terminal is located on said bar intermediate said first terminal and said other end, in spaced insulating relation from said first terminal and in electrical communication with said ground connection of said arrester.

4. Apparatus as described in claim 3, wherein said remotely actuated means comprises a switch spanning said first and second terminals, and control means for closing said switch means from a remote location.

5. Apparatus as described in claim 4, wherein said switch includes a pivotable bar defining an opening at one end thereof, and wherein said control means includes hook means mounted rigidly an said bar, and an elongated cord means engaging said opening, draped over said hook, and extending to said remote location.

* * * * *